(12) United States Patent  
Sørensen

(10) Patent No.: US 11,073,290 B2  
(45) Date of Patent: Jul. 27, 2021

(54) CIRCULATION PUMP ASSEMBLY FOR A HEATING AND/OR COOLING SYSTEM

(71) Applicant: GRUNDFOS HOLDING A/S, Bjerringbro (DK)

(72) Inventor: Søren Emil Sørensen, Ulstrup (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 0 days.

(21) Appl. No.: 16/391,700

(22) Filed: Apr. 23, 2019

(65) Prior Publication Data

US 2019/0249881 A1   Aug. 15, 2019

Related U.S. Application Data

(62) Division of application No. 14/534,564, filed on Nov. 6, 2014, now Pat. No. 10,317,094.

(30) Foreign Application Priority Data

Nov. 7, 2013   (EP) .................................... 13192026

(51) Int. Cl.
*F24D 3/10* (2006.01)
*E04B 5/48* (2006.01)
(Continued)

(52) U.S. Cl.
CPC ................ *F24D 3/105* (2013.01); *E04B 5/48* (2013.01); *F04D 15/0016* (2013.01);
(Continued)

(58) Field of Classification Search
CPC ..... Y10T 137/86027; Y10T 137/85954; Y10T 137/6416; Y10T 137/6497;
(Continued)

(56) References Cited

U.S. PATENT DOCUMENTS 4,770,341 A * 9/1988 Drake ..................... F16L 41/03
                                                             137/271
6,345,770 B1 * 2/2002 Simensen ............. F24D 3/1066
                                                             237/69

(Continued)

FOREIGN PATENT DOCUMENTS

CH           465813      *  6/1967
CH       465 813 A   ‡ 11/1968   ............. F24D 3/105
(Continued)

*Primary Examiner* — Atif H Chaudry
(74) *Attorney, Agent, or Firm* — McGlew and Tuttle, P.C.

(57) ABSTRACT

A circulation pump assembly for a heating and/or cooling system includes an electric drive motor (108) and a connected pump housing (106) in which at least one impeller (118) is situated and which comprises a first inlet (112) and a first outlet (114). The pump housing (106) includes a second inlet (122) which is connected in an inside of the pump housing (106) at a mixing point (130) to the first inlet (112). A regulating valve (134), which is designed for regulating the mixing ratio of two flows mixing at the mixing point (130), as well as a control device, which controls the regulating valve (134) for regulating the mixing ration, are arranged in the pump housing (106). A hydraulic manifold is provided with such a circulation pump assembly.

12 Claims, 5 Drawing Sheets

(51) Int. Cl.
    *F16K 27/00*     (2006.01)
    *F24D 3/12*      (2006.01)
    *F24D 3/14*      (2006.01)
    *F24D 3/02*      (2006.01)
    *F24D 19/10*     (2006.01)
    *F04D 15/00*     (2006.01)
    *F16K 11/00*     (2006.01)
    *F16K 11/22*     (2006.01)

(52) U.S. Cl.
    CPC .......... *F04D 15/0022* (2013.01); *F16K 11/22* (2013.01); *F16K 19/003* (2013.01); *F16K 27/003* (2013.01); *F24D 3/02* (2013.01); *F24D 3/1075* (2013.01); *F24D 3/122* (2013.01); *F24D 3/125* (2013.01); *F24D 3/127* (2013.01); *F24D 3/141* (2013.01); *F24D 3/143* (2013.01); *F24D 3/146* (2013.01); *F24D 19/1012* (2013.01); *F24D 19/1015* (2013.01); *F24D 2220/0207* (2013.01); *F24D 2220/0271* (2013.01); *F24D 2220/042* (2013.01); *Y02B 30/70* (2013.01); *Y10T 137/2499* (2015.04); *Y10T 137/5283* (2015.04); *Y10T 137/6416* (2015.04); *Y10T 137/6497* (2015.04); *Y10T 137/6579* (2015.04); *Y10T 137/85954* (2015.04); *Y10T 137/86027* (2015.04)

(58) Field of Classification Search
    CPC ........... Y10T 137/6579; F24D 19/1015; F24D 3/1075; F24D 19/1012; F24D 3/146; F24D 19/1021; F24D 2220/0207; F24D 2220/0271; F24D 2220/042
    See application file for complete search history.

(56) References Cited

U.S. PATENT DOCUMENTS

| | | | | |
|---|---|---|---|---|
| 2009/0222145 | A1* | 9/2009 | Larsen | G05D 23/1919 700/299 |
| 2010/0189572 | A1* | 7/2010 | Hansen | F04D 15/0027 417/44.1 |
| 2010/0247352 | A1* | 9/2010 | Hansen | F04D 29/605 417/410.1 |
| 2011/0192481 | A1* | 8/2011 | Wenske | F15B 13/0814 137/803 |
| 2011/0290328 | A1* | 12/2011 | Jonsson | F24D 19/1015 137/1 |
| 2013/0048745 | A1* | 2/2013 | Johnson, Jr. | F22B 35/00 237/8 A |

FOREIGN PATENT DOCUMENTS

| | | | | |
|---|---|---|---|---|
| DE | CH 465813 A | ‡ | 11/1968 | ............ F24D 3/105 |
| DE | 201 04615 U1 | ‡ | 5/2001 | ............ F24D 3/105 |
| WO | WO-90/04136 A1 | ‡ | 4/1990 | |

* cited by examiner
‡ imported from a related application

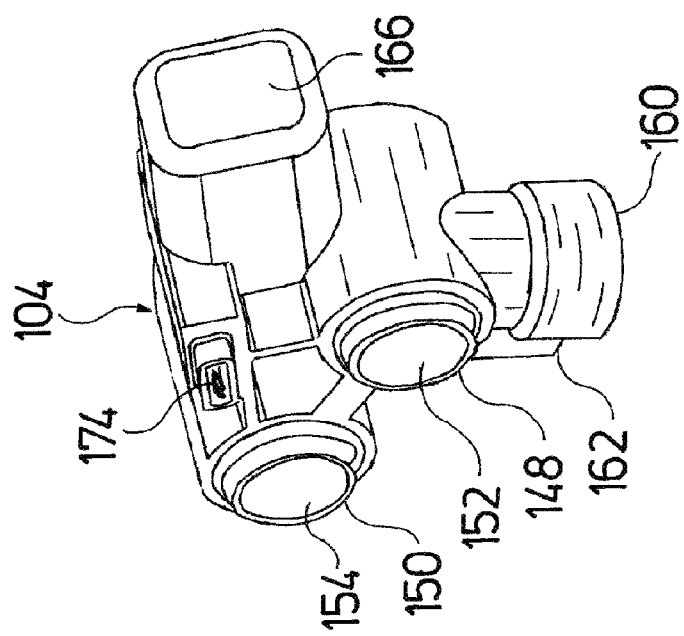
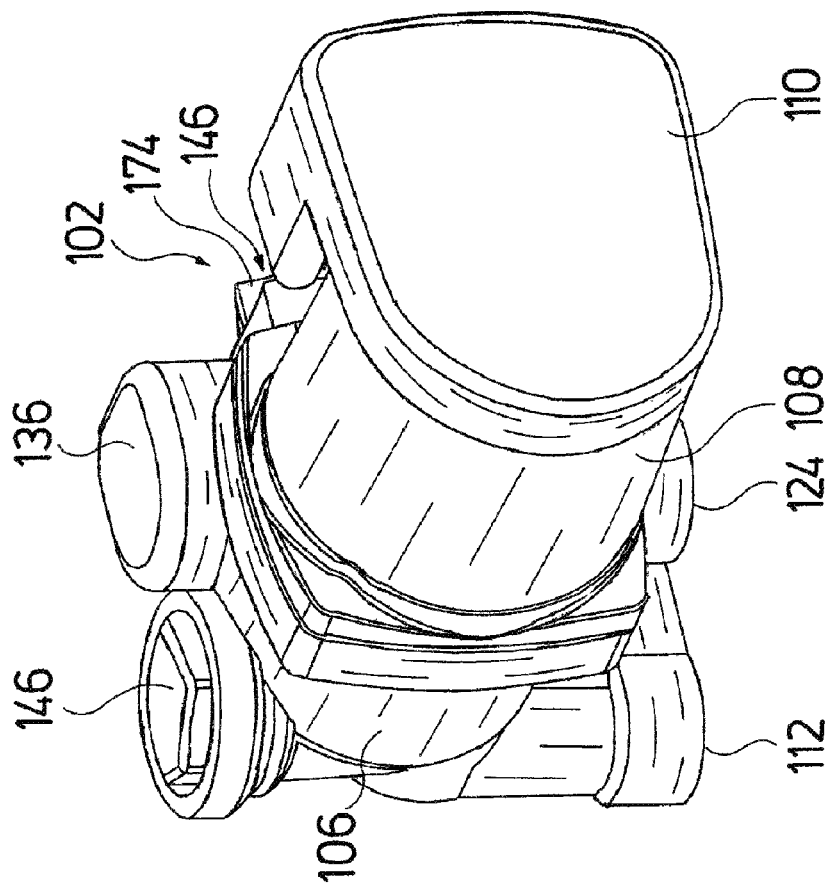

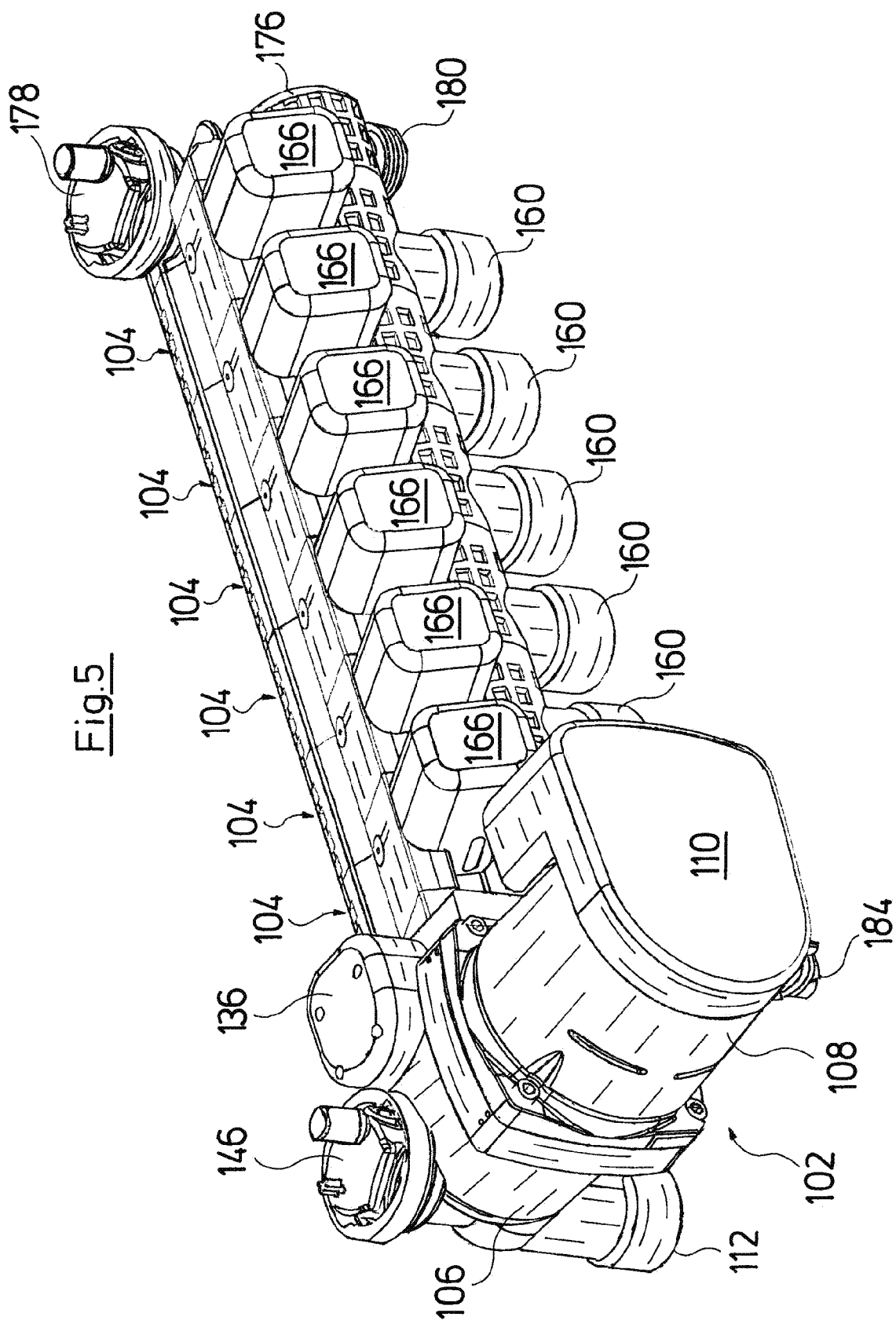

CIRCULATION PUMP ASSEMBLY FOR A HEATING AND/OR COOLING SYSTEM

CROSS REFERENCE TO RELATED APPLICATIONS

This application is a divisional under 37 CFR 1.53(b) of pending prior U.S. patent application Ser. No. 14/534,564 filed Nov. 6, 2014, which claims the priority of European Patent Application EP 13 192 026.6 filed Nov. 7, 2013, the entire contents of each application are incorporated herein by reference.

FIELD OF THE INVENTION

The invention relates to a circulation pump assembly for a heating and/or cooling system, with an electric drive motor and a pump housing which is connected to this drive motor and in which at least one impeller is situated and which pump housing comprises a first inlet and a first outlet.

BACKGROUND OF THE INVENTION

Hydraulic heating and/or cooling systems usually use a liquid heat transfer medium or a fluid which is circulated in a pipe conduit system. As a rule, an electrically driven circulation pump assembly is provided for this.

Moreover, it is known to apply mixing devices in such heating and/or cooling systems, in which mixing devices two fluid flows of a different temperature are mixed, in order to set the desired temperature.

SUMMARY OF THE INVENTION

It is an object of the invention, to improve a circulation pump assembly to the extent that a more simple construction of a heating and/or cooling system with a mixing device is possible.

The circulation pump assembly according to the invention is provided for a heating and/or cooling system and comprises at least one electrical drive motor. This electric drive motor is preferably designed as a canned motor, i.e. as a wet-running electrical drive motor. The drive motor is preferably arranged in a motor housing or stator housing and is connected to a pump housing. I.e. the stator housing is connected to the pump housing, wherein in the case of a wet-running electrical drive motor, preferably the can is sealed with respect to the pump housing, in the inside of the drive motor. The necessary flow paths through the pump are formed in the pump housing and in particular at least one impeller rotatingly driven by the drive motor is situated in the pump housing. I.e. the pump housing comprises a receiving space, in which the impeller rotates. This receiving space is connected via a suction port to at least one first inlet which is formed in the pump housing. Moreover, the receiving space at the exit side or pressure side is connected to at least one first outlet which is provided in the pump housing. The first inlet and the first outlet are provided, in order to connect the pump housing to external components, for example to connecting pipe conduits.

According to the invention, the pump housing comprises a second inlet which in the inside of the pump housing at a mixing point is connected to the first inlet. Thus two fluid flows, specifically from the first and the second inlet, can be mixed at the mixing point. The part of the pump housing, in which the flow paths from the first and the second inlet to the mixing point are formed, is preferably designed of one piece, in particular of plastic. Further preferably, this housing part, in which the flow paths from the first and the second inlet to the mixing point are formed, are likewise designed as one piece with the housing part which delimits the flow path from the mixing point to the receiving space, in which the impeller rotates.

The flow path from the receiving space, in which the impeller rotates, to the at least one first outlet is preferably arranged in a housing part which is designed as one piece with the previously mentioned housing parts of the pump assembly, in particular of plastic.

Moreover, at least one regulating valve or mixing valve is arranged in the pump housing and is designed in a manner such that it can regulate a mixing ratio of two flows mixing at the mixing point. For this, the regulating valve can be situated in the flow path from one of the inlets to the mixing point, in order to be able to directly regulate the fluid flow to the mixing point. In a closed system, the regulating valve can however also be situated at another location, in order to indirectly influence the flow to the mixing point. It can for example be situated in a flow path bypassing the mixing point, wherein by way of regulating the flow in the flow path bypassing the mixing point, the share which is not led through this flow path but via the mixing point, is simultaneously regulated. The regulating valve is preferably applied into a receiver in the pump housing, wherein the receiver is preferably designed as one piece with the housing parts which define the flow paths from the inlets to the mixing point and from the mixing point to the impeller as well as from the impeller to the outlet. Preferably, the regulating valve is removable from the receiver, for example in order to be able to remove it for maintenance purposes. The pump housing can comprise further openings or receivers, which are closed by closure elements or inserted components. These, for example, can be openings or receivers for sensors, bleed valves or likewise.

Furthermore, the circulation pump assembly comprises a control device which is designed thereto to setting up the regulating valve for regulating the mixing ratio.

The integration of a mixing device into the pump housing has the advantage that the number of necessary components for heating and/or cooling systems is reduced, so that the assembly is simplified. Moreover, a compact construction is achieved, which renders it possible to integrate the circulation pump with the mixing device into other components of a heating and/or cooling system in a simple manner.

According to a first possible embodiment, the regulating valve is arranged in a first flow path from the first inlet to the mixing point for regulating the flow through this flow path. The impeller of the pump preferably lies downstream of the mixing point, so that the circulation pump sucks fluid from the mixing point. If the circulation pump assembly or its impeller delivers a constant delivery flow and the flow in the flow path from the first inlet to the mixing point reduces for example, the circulation pump assembly accordingly sucks a higher share of fluid through the flow path from the second inlet to the mixing point. In this manner, the mixing ratio of two different thermally regulated liquids can be changed by way of changing the flow in only one of the flow paths leading to the mixing point.

According to a preferred embodiment of the invention, the pump housing comprises a second outlet which is connected via a channel in the inside of the pump housing to the second inlet. This channel or flow path thereby does not lead via the impeller of the circulation pump, but in a circuit of a heating and/or cooling system preferably forms a return, from which fluid is led to the mixing point, whereas the first inlet of the pump housing is envisaged for connection to an external fluid supply from a heat source or cold source. In this manner, fluid from a fluid supply is mixed with returning fluid from the return, at the mixing point. In the case of a heating system, the fluid from the return usually has a lower temperature than the fluid fed from a heat source through the first inlet. Conversely, in a cooling system, usually the fluid from the return usually has a higher temperature than the fluid fed from a cold source through the first inlet. The housing part which defines the channel in the inside of the pump housing from the second inlet to the second outlet, is preferably likewise designed as one piece with the housing parts which are described above and which define the remaining flow paths through the pump housing. The assembly of individual parts and the sealing of individual parts are avoided in this manner, since all essential flow paths can be formed in a housing which is manufactured in a single-pieced manner, preferably of plastic.

According to a particularly preferred embodiment of the invention, the regulating valve for regulating the flow is arranged in the channel between the second inlet and the second outlet, downstream of a connection of this channel to the mixing point. As described, the second outlet preferably serves for the connection with a return to a heating source or cold source, whereas the first inlet serves for connection to a feed from a heat source or cold source. The first outlet of the pump assembly serves for the connection of at least one load circuit, whereas the second inlet serves for the connection of the return of this at least one load circuit. With the described arrangement of the regulating valve in the channel from the second inlet to the second outlet downstream of the connection to the mixing point, the flow share flowing back to the heat source or to the cold source is thus regulated via the regulating valve. If this flow share is reduced, accordingly a higher share from the return is led from the second inlet to the mixing point. If the flow away through the second outlet is increased, then this part of the flow which is led to the mixing point accordingly reduces.

According to a further possible embodiment of the invention, the regulating valve or mixing valve can be designed as a three-way valve which is arranged at the mixing point. Thus the valve can directly setting up the mixing ratio between two entries to one exit by way of adjusting one valve element.

As described, the pump housing is preferably manufactured in a single-piece manner, preferably of plastic. Thereby, particularly preferably, the complete pump housing with the exception of inserted components such as valves or sensors and, as the case may be, necessary closure elements of openings, is designed as one piece as a component which preferably defines all necessary flow paths between the first inlet, second inlet and first outlet, and, as the case may be the second outlet, in its interior. Moreover, this pump housing comprises a receiving space for at least one impeller.

The regulating valve is preferably a motorically driven valve. In particular, it is the case of a valve whose opening degree is changeable, in particular is proportionally changeable. This for example can be effected via a drive motor designed as a stepper motor. Further preferably, the regulating valve can also be completely closed via the drive.

Usefully, a control device is provided which is electrically connected to the regulating valve for its activation. I.e. the control device preferably sets the opening degree of the regulating valve and activates this such that it sets the desired opening degree. Thereby, the control device can regulate the opening degree preferably on the basis of a detected temperature signal, in order to set a desired feed temperature downstream of the mixing point, by way of the mixing of the flows at the mixing point.

The control device is preferably arranged in an electronics housing, wherein the electronics housing further preferably is arranged on the drive motor of the pump housing. Thereby, the electronics housing can be integrated into a stator housing or motor housing of the drive motor or be formed by the stator housing or motor housing. Alternatively, the electronics housing can be applied as a separate housing onto the outer side of the motor housing or stator housing of the drive motor. Further preferably, the electronic components for the activation or regulation of the drive motor of the circulation pump assembly are arranged in this electronics housing. This design has the advantage that all electronic components, which are necessary for the regulation or control of the drive motor and of the regulating valve of the mixing device, can be integrated into an electronics housing of the circulation pump assembly.

Further preferably, the control device is signal-connected to at least one temperature sensor which is preferably arranged on a flow path in the inside of the pump housing. Thus the temperature sensor can detect the temperature of the fluid in this flow path. The control device can set the mixing ratio on the basis of the detected temperature, by way of activating the regulating valve, in order to achieve a desired temperature as a feed temperature. Preferably, the temperature sensor is therefore situated on a flow path downstream of the mixing point, so that it detects the temperature of the mixed fluid.

According to a particular embodiment of the invention, the pump housing furthermore on a housing side is designed for the connection, i.e. preferably direct connection to a hydraulic manifold. This permits a hydraulic manifold to be integrated with the circulation pump into a construction unit, wherein the manifold is arranged directly adjacent the circulation pump. In this manner, a compact construction with a simple assembly is made possible, since the number of necessary external pipe connections is minimized. The hydraulic manifold preferably serves for being able to connect several load circuits to the exit side of the circulation pump, i.e. to its first outlet and second inlet. Thereby, a feed conduit in the hydraulic manifold and through which the fluid is fed to the entries of the several load circuits, is connected to the first outlet of the pump housing, whereas the return conduit in the hydraulic manifold is connected to the second inlet of pump assembly. The exits of several load circuits are connected to the return conduit in the hydraulic manifold via suitable connections.

Thus preferably, the second inlet as well as the first outlet of the pump housing is situated on the housing side which is designed for connection to the hydraulic manifold. The second inlet as well as the first outlet is thereby preferably designed as hydraulic couplings, in particular plug-in couplings, which can engage directly with corresponding couplings on the hydraulic manifold, in order to permit a hydraulic connection between the second inlet and a return conduit in the hydraulic manifold and between the first outlet and a feed conduit in the hydraulic manifold.

The subject matter of the invention, apart from the previously described circulation pump assembly, is also a hydraulic manifold with such a circulation pump assembly, as has been previously described. The hydraulic manifold comprises at least one load module which is connected to the pump housing of the circulation pump assembly. Thereby, the load module in its inside comprises a section of the feed conduit and/or a section of the return conduit, wherein the section of the feed conduit is connected to the first outlet of the pump housing and comprises at least one feed connection, whereas the section of the return conduit is connected to the second inlet of the pump housing and comprises at least one return connection. A load circuit is connected to the feed connection and the return connection. Thus fluid delivered via the first outlet of the pump housing can be led to the entry of a load circuit connected on the feed connection, and this fluid then flows from the exit of the load circuit via the return connection back into the second entry of the pump housing. The preceding description is referred to with regard to the further design of the circulation pump assembly.

The at least one load module is preferably releasably connected to the pump housing. This permits a simple assembly by way of a modular construction, and a simple dismantling of the construction unit for maintenance and/or repair purposes.

Further preferably, the load module is connected at a first longitudinal end to the pump housing and at a second distant longitudinal end to a further load module, preferably in a releasable manner. In this manner, several load modules can be connected to one another and rowed onto one another in the longitudinal direction. Thereby, the longitudinal direction is essentially the direction, in which the sections of the feed conduit and of the return conduit are defined in the load modules extend. In this manner, a desired number of load modules can be rowed on one another and this number depends on the number of load circuits to be supplied, wherein preferably a load module is provided for each load circuit. Thus a modularly adaptable hydraulic manifold is created. Hydraulic couplings are formed between the load modules and correspond to the hydraulic coupling between the pump housing and the first adjacent load module, so that all load modules can be designed equally.

Preferably, a regulating device for regulating the flow through a load circuit connected to the feed connection and to the return connection is arranged in the at least one load module. The regulating device can preferably be a regulating valve, in particular an electromotorically driven regulating valve in the form of a proportional valve. Alternatively, in some other way powered control valve can be used, for example with thermo-electric drive. Thereby, the regulating valve can be designed such that it can also be completely closed, in order to completely close, i.e. switch off the load circuit. The flow regulation by way of a regulating device in each load module has the advantage that the flow or volume flow can be individually set for each load circuit and be changed in operation. Thus the flow can be adapted to the current demands, in particular to the energy requirement of the load circuit. Preferably, the regulating device is arranged in a flow path from the return connection to the section of the return conduit in the inside of the load module. It could however also be suitably arranged in the flow path between the section of the feed conduit and the feed connection.

A control device for the activation of the regulating devices of the load modules is further preferably provided. Particularly preferably, a manifold control device which is signal-connected to the at least one regulating device in the at least one load module, preferably to the regulating devices of several load modules for their activation, is arranged in the circulation pump assembly, preferably in an electronics housing arranged on the drive motor. I.e. there is a central control device in the form of a manifold control device which activates the regulating devices of the individual load modules, in order to provide a flow regulation for the load circuits. The manifold control device is preferably integrated into the electronics housing on the drive motor of the circulation pump assembly as is the case with the control devices described above, so that only a single electronics housing needs to be provided.

Further preferably, an electric coupling is provided between the load module and the pump hosing and preferably between the load module and a further load module. An electrical connection for the energy supply and preferably also for signal transmission from the manifold control device arranged in the circulation pump assembly to the regulating devices in the load modules are created via this coupling. In the case that a multitude of load modules is provided, electrical connections in the form of electrical couplings, in particular plug-in couplings are likewise formed between these load modules, via which couplings the regulating devices of the further load modules are provided with energy and are activated.

The invention is hereinafter described by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 3 is a perspective view of a main module of the hydraulic manifold according to the invention;

FIG. 4 is a schematic view of a load module of the hydraulic manifold according to the invention;

FIG. 5 is a perspective view of the hydraulic manifold with the main module according to FIG. 3 and the load module according to FIG. 4.

DESCRIPTION OF THE PREFERRED EMBODIMENTS

Figure 1:
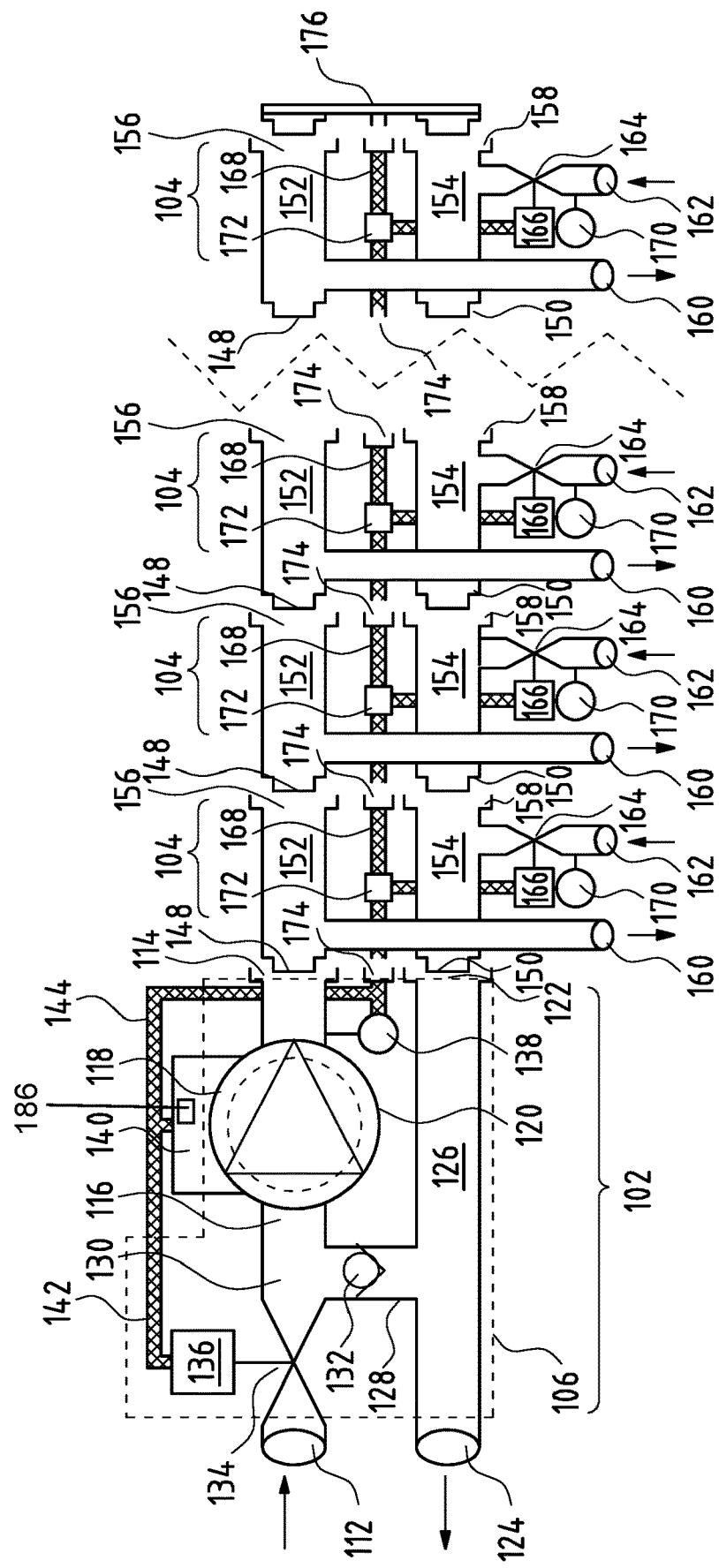
FIG. 1 is a schematic view showing a hydraulic manifold according to the invention, in the non-assembled condition.

Referring to the drawings, the hydraulic manifold shown in the FIGS. 1-6 is constructed in a modular manner and consists of essentially of two types of modules, of a main module 102 as well as of several load modules 104. The main module 102 is formed essentially by a pump assembly. As is shown in FIG. 3, the pump assembly comprises a pump housing 106 with a stator housing 108 which is arranged thereon. The necessary flow paths as well as a receiving space 120 for an impeller 118 are formed in the pump housing 106. The impeller 118 is driven by an electrical drive motor which is arranged in the motor housing or stator housing 108. Thereby, the electrical drive motor is preferably designed as a wet-running motor. An electronics housing 110, in which amongst other things the electronic components for the control or regulation of the electrical drive motor in the stator housing 108 are accommodated, is arranged on the outer side of the stator housing 108 at the axial end.

Figure 2:
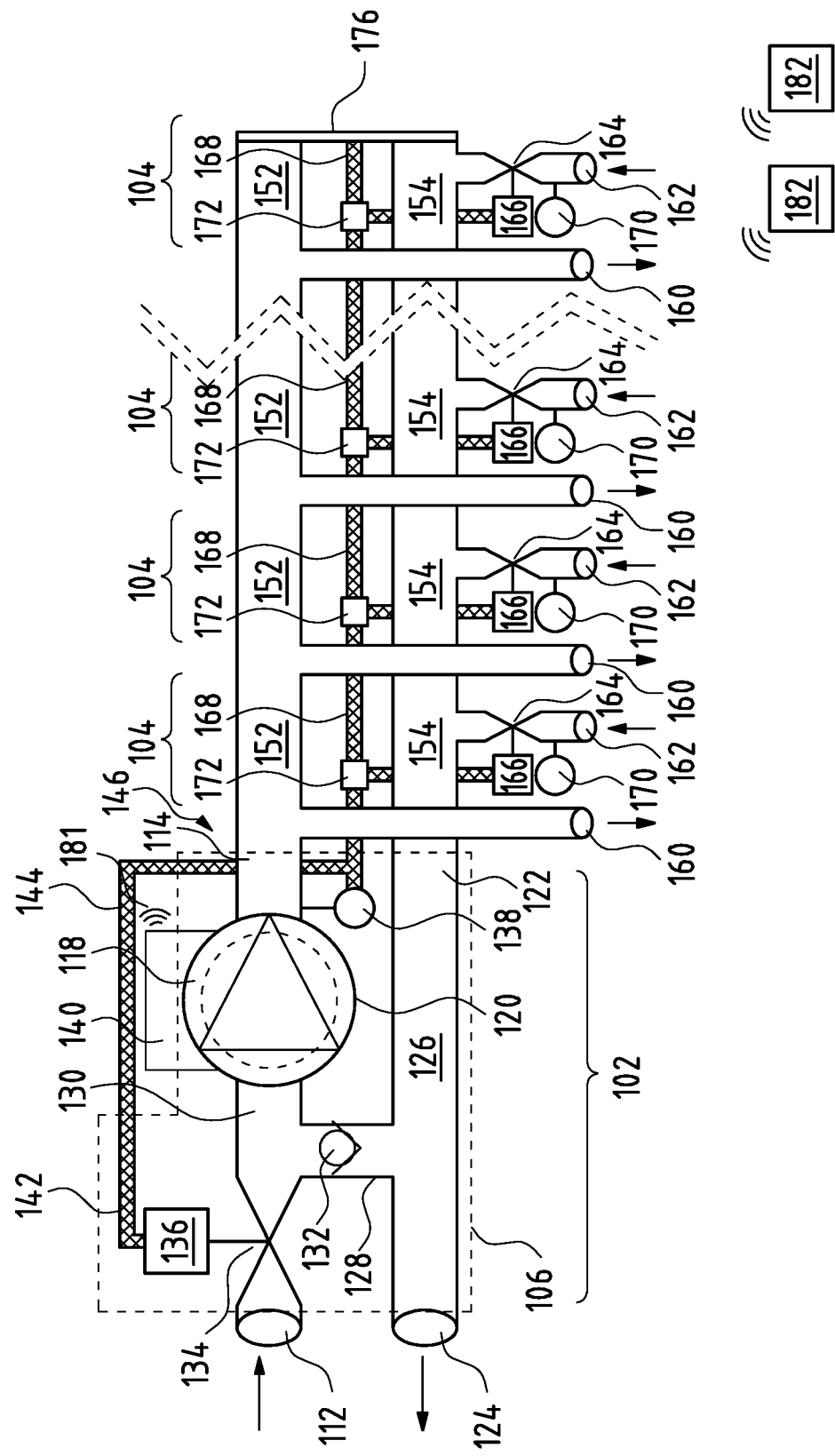
FIG. 2 is a schematic view showing the hydraulic manifold according to FIG. 1, in the assembled condition.
Figure 6:
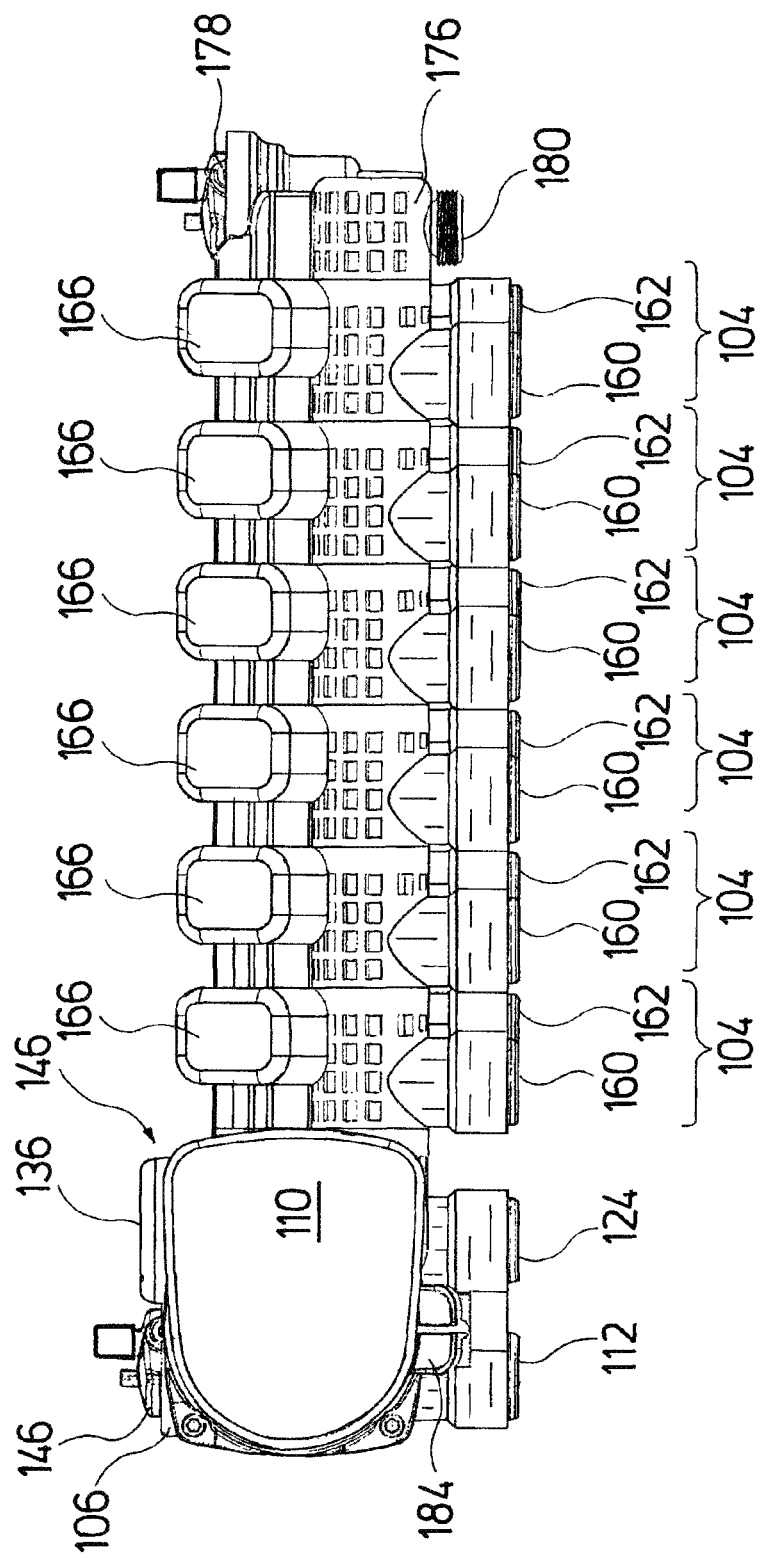
FIG. 6 is a plan view of the hydraulic manifold according to FIG. 5.

The circulation pump assembly shown in FIG. 3 forms the main module 102. With this circulation pump assembly, apart from the impeller, the components of a mixing device, whose function is described by way of FIGS. 1 and 2, are accommodated in the pump housing 106, next to the impeller. The pump housing comprises a first inlet 112 as well as a first outlet 114. The circulation pump with the impeller 118 lies in a first flow path 116 between the first inlet 112 and the first outlet 114. The impeller 118 lies in a receiving space 120 in the inside of the pump housing 106 which is schematically represented in the FIGS. 1 and 2 as a dashed line. The impeller 118, driven by the drive motor, delivers a fluid functioning as a heat transfer medium, i.e. a liquid, from the first inlet 112 to the first outlet 114.

The pump housing 106 moreover comprises a second inlet 122 as well as a second outlet 124. The second inlet 122 is connected to the second outlet 124 via a channel 126 which forms a flow path in the inside of the pump housing 106. The channel 126 does not lead through the impeller 118, but extends separately in the pump housing 106. The channel 126 is connected via a connection 128 to a mixing region or mixing point 130 in the flow path 116. The fluid flows from the first inlet 112 and the second inlet 122 are mixed at the mixing point 130. Since the impeller 118 is situated downstream of the mixing point 130, it sucks fluid from the first inlet 112 as well as from the channel 126 via the connection 128 and thus from the second inlet 122. A check valve 132 is arranged in the connection 128 and permits a flow only in the direction from the channel 126 to the mixing point 130.

A regulating valve 134 is arranged in the flow path from the first inlet 112 to the mixing point 130. This is settable in its opening degree via an electrical drive motor 136. The regulating valve 134 functions as a mixing valve, in order to be able to set the mixing ratio of the two mentioned flows at the mixing point 130. No flow can be effected from the first inlet 112 to the mixing point 130 if the regulating valve 134 is closed, and the circulation pump via its impeller 118 sucks fluid exclusively via the second inlet 122 through the channel 126 and the connection 128. If the regulating valve 134 is opened, a part of the flow through the pump assembly is sucked through the first inlet 112, so that a flow from the first inlet 112 is mixed with a flow from the second inlet 122, in the mixing point 130. The mixing ratio changes depending on the opening degree of the regulating valve 134. If now the first inlet 112 is connected to a feed of a heating system, through which hot fluid is fed, and the second inlet 122 is connected to a return of at least one load circuit, colder fluid is then fed through the second inlet 122 and admixed. Thus, by way of admixing the colder fluid from the second inlet 122 to the warmer fluid from the first inlet 112, it is thus possible to reduce the feed temperature of the fluid exiting from the first outlet 114 downstream of the mixing point 130, with respect to the temperature of the fluid entering into the first inlet 112. The actually reached feed temperature at the first outlet 114 is detected via a temperature sensor 138 which is likewise integrated into the circulation pump assembly or its pump housing 106. It is to be understood that the regulating valve 134 could also be arranged in a corresponding manner between the second outlet 124 and the branching of the connection 128 from the channel 126, instead of in the flow path between the first inlet 112 and the mixing point 130.

In the case that the shown hydraulic manifold is used for a cooling system, a cold fluid can be fed through the first inlet 112, whilst warmer fluid is fed via the second inlet 22 from the return of the load circuit. Thus, by way of the admixing of this warmer fluid at the mixing point 130, it is possible to increase the feed temperature of the fed cold fluid. Here too, the temperature can be set to the desired temperature by way of setting the mixing ratio.

The regulation or control of this mixing device, i.e. the temperature regulation, is assumed by a control device 140 which is arranged in the electronics housing 110 of the circulation pump assembly 102. The control device 140 activates the motor 136 of the regulating valve 134 such that this assumes an opening degree which is set by the control device 140. For this, the motor 136 of the regulating valve 134 is connected to the control device 140 via a signal connection 142 which can be designed for example as a data bus. The temperature sensor 138 is also connected to the control device 140 via a signal connection 144. Thus, the control device 140 by way of setting the regulating valve 134 can regulate the admixing of the fluid from the return at the mixing point 130 and thus set a desired feed temperature, wherein a corresponding feedback to control device 140 is effected via the temperature sensor 138, and this permits a temperature regulation.

All the described hydraulic components of the mixing device which are shown in the FIGS. 1 and 2, as well as the impeller 118 of the circulation pump assembly are arranged in the pump housing 106. The pump housing 106 with all its parts, in which the described flow paths are formed, is preferably manufactured as one piece of plastic. Thus, a very simple connection between the described mixing device and the components of the circulation pump can be achieved, since all components are integrated into a single-piece housing 106. A very compact construction with as simultaneously simple assembly is achieved by way of this. Additionally, a bleed valve 146 which is not shown in the FIGS. 1 and 2, is arranged in the pump housing 106.

The previously described mixing device in the example of a hydraulic manifold which is shown here, serves as a mixing device for a floor heating. The hydraulic manifold is designed as a manifold for a floor heating installation. The mixing device thus serves for reducing the temperature of a heating medium to the temperature necessary for the floor heating. This is effected by way admixing the colder fluid from the return, as has been previously described.

The hydraulic manifold shown here, which is provided for use as a manifold for a floor heating system, is moreover constructed in a modular manner. The first outlet 114 and also the second inlet 122 are designed as hydraulic couplings at one side 146 of the main module 102, i.e. of the circulation pump assembly 102, into which couplings a feed coupling 148 as well as a return coupling 150 of the load module 104 arranged adjacently the main module 102 engage. A section of a feed conduit 152 and also a section of the return conduit 154 are formed in the load module 104. The section of the feed conduit 152 connects the first feed coupling 148 to a second feed coupling 156 which is situated at the opposite longitudinal end of the load module 104. Accordingly, the section of the return conduit 154 connects the first return coupling 150 to a second return coupling 158 situated at the opposite longitudinal end of the load module 104. The first feed coupling 148 as well as the first return conduit 150 are designed as male coupling parts which can engage into the second feed coupling 156 as well as second return coupling 158 which are designed as a female coupling parts, of an adjacent load module 104, in order to form a fluid-leading connection between sections 152 of the feed conduit which are adjacent one another, as well as sections of the return conduit 154 which are adjacent one another. The first outlet 114 on the main module 102 in a manner corresponding to the second feed coupling 156 is designed as a female coupling, so that the first feed coupling 148 of the adjacent load module 104 can come into fluid-leading connection with the first outlet 114. Accordingly, the second inlet 122 is likewise designed as a female hydraulic coupling, whose design corresponds to that of the second return coupling 158, so that the first return coupling 150 of the adjacent load module 104 can engage with the second inlet 122 for creating a hydraulic connection.

The section of the feed conduit 152 of each load module comprises a feed connection 160. Moreover, in each load module, the section of the return conduit 154 comprises a return connection 162. The entry of a load circuit is connected on the feed connection 160 of each load module 104, and the exit of the associated load circuit is connected onto the return connection 162 of each load module 104. The load circuits here in each case form individual circuits of a floor heating installation, wherein each circuit preferably heats one room.

Moreover, a regulating valve 164 is arranged in each load module 104, between the return connection 162 and the section of the return conduit 154 in the flow path. Each regulating valve 162 comprises an electric drive motor 166, by way of which the associated regulating valve 164 is adjustable in its opening degree. The regulating valves 164 are moreover designed such that they can be completely closed. By way of this complete closure, it is possible to interrupt or switch off the connected load circuit. If the regulating valve 164 is opened, the flow or the volume flow through the load circuit connected to the feed connection 160 or to the return connection 162 can be regulated by way of changing the opening degree via the drive motor 166. The flow can be varied and be adapted to the respective operating condition, in particular to the energy requirement of the load circuit, for each load circuit on operation of the installation, since such a regulating device with a regulating valve 164 is arranged in each load module. The drive motors 166 are connected to the control device 140 functioning as a manifold control device, via an electric connection 168 in each load module 104, said electric connection serving for the energy supply and for data transmission. Moreover, a temperature sensor 138/170 is arranged in each case in the load modules 104, in the flow path between the return connection 152 and the section 154 of the return conduit. The temperature sensor 170 detects the return temperature at the exit of the connected load circuit. The temperature sensors 170 are in each case likewise connected to the electric connection 168 which comprises or forms a data bus.

The load modules 104 each have a module control device 172 for the data transmission or communication with the control device 140. The module control devices 172 permit an addressing of the individual load modules 104 by the control device 140. The control device 140 and the module control device 172 are preferably designed for automatic coupling. Thus, the control device 140 preferably assigns an address to the module control devices 172 and thus to the associated load module 104, so that the control device 140 on the one hand can detect data from the respective load module 104, for example temperature values from the temperature sensor 170, in a targeted manner and simultaneously activate the drive motor 166 for setting the regulating valve 164, in a targeted manner. The flow through the connected load circuit is preferably set by the control device 140 via the regulating valve 164 in dependence on the temperature difference between the temperature sensors 138 and 170, for each load module 104, so that the temperature difference assumes a constant predefined value. Electrical plug-in couplings 174 are provided between the individual load modules 104, for creating the electrical connection or a data connection between the individual load modules 104. For this, corresponding parts of the electrical plug-in couplings 174 are provided on opposite longitude ends of the load modules 104 which in each case can engage with the electrical plug-in coupling 174 of an adjacent load module 104. Accordingly, an electrical plug-in coupling 174 is present between the main module 102 and the adjacent load module 104.

It is possible to connect a desired number of load modules 104 to the main module 102, depending on how many load circuits are to be connected, due to the design of the electrical and hydraulic couplings between the load modules 104 as well as between the load module 104 and the main module 102. Thus, a flexible adaptation to different heating or cooling systems is possible and it is not necessary to keep available premanufactured manifolds in each case for certain numbers of load circuits. In contrast, a hydraulic manifold of the desired size can be constructed in a very simple manner by way of putting together the corresponding number of load modules 104, as is shown in FIG. 2. The last load module 104 which is away from the main module 102 is thereby closed off by way of an end-piece 176, at its free end i.e. its end which is away from the last adjacent load module 104. The end-piece 176 in particular serves for the closure of the second feed coupling 156 as well as of the second return coupling 158 at the end, so that the section of the feed conduit 152 and the section of the return conduit 154 at the free end are sealed to the outside. In the example shown in FIG. 6, the end-piece 176 moreover yet has a bleed valve 178 as well as a connection 180 which is connected to the return conduit 154 and for example can be used for filling or rinsing. This connection 180 is closed in normal operation. Six load modules 104 for six load circuits are joined onto the main module 102 in the examples shown in the FIGS. 5 and 6.

A mechanical connection between the load modules 104 as well as between the first load module 104 and the main load module 102 is created, apart from the described hydraulic and electric connections. The mechanical connection in this example is created by way of engagement of the hydraulic couplings into one another, i.e. of the first feed coupling 148 with the second feed coupling 156 as well as of the first return coupling 150 with the second return coupling 158. However, it is to be understood that here additionally locking or securing elements can be provided, in order to create a fixed mechanical connection between the individual modules 102, 104.

If the modules 102, 104 are joined onto one another, the sections of the feed conduit 152 of the individual load modules 104, as is to be seen in FIG. 2, form a continuous feed conduit 152 whilst the sections of the return conduit 154 form a continuous return conduit 154. The control device 140 forms a central manifold control device which controls or regulates the circulation pump, i.e. its drive motor 108, in particular carries out a speed control or regulation for the drive motor 108, as well as regulates the mixing device by way of activating the regulating valve 134. Moreover, the control device 140 here serves as a central control device for the regulating valves 154 in all load circuits 104. In this, as is described above, it effects a flow regulation and thus serves for switching the individual load circuits on and off. For this, the control device 140 comprises a communication interface or a communication device 181 which permits a communication with external room thermostats 182, in this example via radio. Only two room thermostats 182 are shown in FIG. 2. It is however to be understood that preferably a room thermostat 182 is provided for each room to be thermally regulated. A desired room temperature can be set at the room thermostat 182. If the actual room temperature differs from the set setpoint, the room thermostat 182 sends a signal to the communication interface 181 of the control device 140 which thereupon initiates the switching-on of a load circuit associated with the room thermostat 182, by way of opening the associated regulating valve 164. If a desired room temperature is achieved, then the room thermostat 182 in turn sends a signal, whereupon the control device 140 via the drive motor 166 closes the regulating valve 164 associated with this load circuit, and thus switches off the load circuit which leads through the associated room.

Moreover, an electrical connection 184 is formed on the electronics housing 110 and serves for the electric connection of the complete hydraulic manifold and all its electrical components. The electrical connection 184 is designed here as a plug, on which a mains lead can be connected. Preferably, a mains part 186 is integrated in the electronics housing 110 and only small voltages are transmitted via the electrical connections 168 to the load modules 104.

While specific embodiments of the invention have been shown and described in detail to illustrate the application of the principles of the invention, it will be understood that the invention may be embodied otherwise without departing from such principles.

APPENDIX

List of Reference Numerals

102—main module
104—load module
106—pump housing
108—stator housing
110—electronics housing
112—first inlet
114—first outlet
116—flow path
118—impeller
120—receiving space
122—second inlet
124—second outlet
126—channel
128—connection
130—mixing point
132—check valve
134—regulating valve
136—motor
138—temperature sensor
140—control device or manifold control device
142, 144—signal connections
146—side
148—first feed coupling
150—first return coupling
152—feed conduit
154—return conduit
156—second feed coupling
158—second return coupling
160—feed connection
162—return connection
164—regulating valve
166—drive motor
168—electrical connection
170—temperature sensor
172—module control device
174—electrical plug-in coupling
176—end piece
178—bleed valve
180—connection
181—communication interface
182—room thermostat
184—electrical connection

What is claimed is:

1. A hydraulic manifold and circulation pump assembly combination comprising:
   a circulation pump assembly comprising:
      a drive motor;
      at least one impeller;
      a pump housing connected to this drive motor, the at least one impeller being situated in the pump housing, the pump housing comprising a first inlet, an outlet and a second inlet which is connected in an inside of the pump housing at a mixing point to the first inlet;
      a regulating valve regulating a mixing ratio of two flows mixing at the mixing point, the regulating valve being arranged in the pump housing; and
      a control device controlling the drive motor and the regulating valve for regulating the mixing ratio;
   at least one load module connected to the pump housing, the at least one load module comprising a section of a feed conduit and/or a section of a return conduit, wherein the section of the feed conduit is connected to the first outlet of the pump housing and comprises a feed connection and the section of the return conduit is connected to the second inlet of the pump housing and comprises a return connection, the at least one load module further comprising a regulating device for regulating the flow through a load circuit connected to the feed connection, the control device serving as a manifold control device and the control device being configured to control the regulating device, wherein an electronics housing is arranged on the drive motor, the control device being arranged in the electronics housing and signal-connected to the regulating device on the at least one load module for activation thereof, wherein voltages are transmitted via electric connections between the control device and the at least one load module.

2. A hydraulic manifold according to claim 1, wherein the at least one load module is releasably connected to the pump housing.

3. A hydraulic manifold according to claim 1, further comprising a further load module, wherein the at least one load module has a first longitudinal end connected releasably to the pump housing, and has a distant, second longitudinal end connected releasably to the further load module.

4. A hydraulic manifold according to claim 1, wherein the return connection is arranged in the at least one load module.

5. A hydraulic manifold according to claim 1, further comprising:
   a stator housing, the pump housing comprising a load module connection for connection to the at least one load module, the stator housing being located between the pump housing and the electronics housing, wherein the stator housing, the pump housing and the electronics housing are arranged in an axial direction with respect to a longitudinal axis of the electronics housing, the load module connection being located at a radially spaced location with respect to the longitudinal axis of the electronics housing.

6. A hydraulic manifold according to claim 1, further comprising a further load module and an electric coupling formed between the load module and the pump housing and between the load module and the further load module, the load module and the further load module being connected in an axial direction with respect to a longitudinal axis of the load module, the electronics housing being located offset from the load module and the further load module, wherein the electronics housing is located at a radially spaced location from the load module with respect to the longitudinal axis of the load module.

7. A circulation pump assembly for a heating and/or cooling system, the circulation pump assembly comprising:
a pump comprising:
   a drive motor;
   at least one impeller;
   a pump housing connected to the drive motor, the at least one impeller being arranged in the pump housing, the pump housing comprising a first inlet, a first outlet, a second outlet and a second inlet which is connected in an inside of the pump housing at a mixing point to the first inlet;
   an electronics housing connected to the pump housing, the electronics housing comprising an electronics interior;
   a regulating valve regulating a mixing ratio of two flows mixing at the mixing point, the regulating valve being arranged in the pump housing; and
   a control device arranged in the electronics interior of the electronics housing, the control device being configured to control the drive motor, the control device being further configured to control at least the regulating valve for regulating the mixing ratio, the first inlet and the first outlet defining a first flow path, the impeller being arranged in the first flow path, the second inlet being connected to the second outlet via a channel in the pump housing, the second outlet, the second inlet and the channel defining a second flow path, the first flow path being in fluid communication with the second flow path, the control device comprising a pump control configured to control the pump, the control device further comprising a control for controlling the regulating valve, the pump control being configured to regulate a speed of the pump;
at least one load module, the pump housing comprising a plug coupling, the at least one load module being connected to the pump housing via the plug coupling, the at least one module comprising a regulating device for regulating the flow through the load circuit, the control device being configured as a manifold control device to control the regulating device, wherein voltages are transmitted via electric connections between the control device and the at least one load module; and
a stator housing, the pump housing comprising a load module connection for connection to the at least one load module, the stator housing being located between the pump housing and the electronics housing, wherein the stator housing, the pump housing and the electronics housing are arranged in an axial direction with respect to a longitudinal axis of the electronics housing, the load module connection being located at a radially spaced location from the longitudinal axis of the electronics housing.

8. A circulation pump assembly according to claim 7, wherein the first outlet defines at least a portion of the plug coupling, the plug coupling defining an opening, at least a portion of the at least one load module being arranged in the opening.

9. A circulation pump assembly according to claim 7, further comprising:
a temperature sensor measuring a fluid temperature of fluid exiting the first outlet, the control device controlling the regulating valve and the drive motor based on the fluid temperature measured via the temperature sensor.

10. A circulation pump assembly according to claim 9, further comprising:
another temperature sensor measuring a return fluid temperature of a load circuit, the control device controlling the regulating valve and the drive motor based on the return fluid temperature measured via the another temperature sensor.

11. A circulation pump assembly according to claim 7, wherein a mains adapter is arranged in the electronics housing.

12. A hydraulic manifold according to claim 1, wherein a mains adapter is arranged in the electronics housing.

* * * * *